(12) United States Patent
Adams et al.

(10) Patent No.: US 9,176,998 B2
(45) Date of Patent: *Nov. 3, 2015

(54) MINIMIZATION OF SURPRISAL CONTEXT DATA THROUGH APPLICATION OF A HIERARCHY OF REFERENCE ARTIFACTS

(71) Applicant: International Business Machines Corporation, Armonk, NY (US)

(72) Inventors: Samuel S Adams, Rutherfordton, NC (US); Robert R. Friedlander, Southbury, CT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 71 days.

This patent is subject to a terminal disclaimer.

(21) Appl. No.: 13/922,625

(22) Filed: Jun. 20, 2013

(65) Prior Publication Data

US 2014/0358941 A1 Dec. 4, 2014

Related U.S. Application Data

(63) Continuation-in-part of application No. 13/903,488, filed on May 28, 2013.

(51) Int. Cl.
*G06F 17/30* (2006.01)
*G06Q 10/06* (2012.01)

(52) U.S. Cl.
CPC ........ *G06F 17/30303* (2013.01); *G06Q 10/063* (2013.01)

(58) Field of Classification Search
CPC .............................. G06F 17/30699

USPC .......................................... 707/745
See application file for complete search history.

(56) References Cited

U.S. PATENT DOCUMENTS 5,664,179 A 9/1997 Tucker
6,633,868 B1 10/2003 Min et al.
(Continued)

FOREIGN PATENT DOCUMENTS

JP 2007249421 A 9/2007

OTHER PUBLICATIONS

Carney et al. "Monitoring Streams—A New Class of Data Management Applications." Proceedings of the 28th VLDB Conference, Hong Kong, China; pp. 1-12; 2002.
(Continued)

*Primary Examiner* — Noosha Arjomandi
(74) *Attorney, Agent, or Firm* — Brown & Michaels, PC; John R. Pivnichny

(57) ABSTRACT

A method, system, and computer program product for minimizing surprisal context data. The method comprising the steps of: identifying characteristics of a data event; receiving an input of rank of at least two identified characteristics of the data event; the computer generating a hierarchy of ranked, identified characteristics based on the rank of the at least two identified characteristics of the data event; and comparing the hierarchy of ranked, identified characteristics to a repository of reference artifacts arranged in characteristic context patterns. If at least one reference artifact arranged in characteristic context patterns from the repository matches the hierarchy of ranked, identified characteristics, the characteristic context pattern is stored as a surprisal context filter and compared to a data input of data events to detect anomalous events.

15 Claims, 4 Drawing Sheets

(56) References Cited

U.S. PATENT DOCUMENTS

| | | | |
|---|---|---|---|
| 7,031,884 B1 | 4/2006 | Radulovic et al. | |
| 7,058,628 B1 | 6/2006 | Page | |
| 7,523,123 B2 | 4/2009 | Yang et al. | |
| 7,716,228 B2 * | 5/2010 | Sahasrabudhe et al. | 707/748 |
| 7,752,154 B2 | 7/2010 | Friedlander et al. | |
| 7,778,955 B2 | 8/2010 | Kuji | |
| 7,783,586 B2 | 8/2010 | Friedlander et al. | |
| 7,788,202 B2 | 8/2010 | Friedlander et al. | |
| 7,788,203 B2 | 8/2010 | Friedlander et al. | |
| 7,792,774 B2 | 9/2010 | Friedlander et al. | |
| 7,792,776 B2 | 9/2010 | Friedlander et al. | |
| 7,792,783 B2 | 9/2010 | Friedlander et al. | |
| 7,805,390 B2 | 9/2010 | Friedlander et al. | |
| 7,805,391 B2 | 9/2010 | Friedlander et al. | |
| 7,809,660 B2 | 10/2010 | Friedlander et al. | |
| 7,836,053 B2 * | 11/2010 | Naef, III | 707/737 |
| 7,853,611 B2 | 12/2010 | Friedlander et al. | |
| 7,870,113 B2 | 1/2011 | Gruenwald | |
| 7,930,262 B2 | 4/2011 | Friedlander et al. | |
| 7,945,566 B2 | 5/2011 | James et al. | |
| 7,953,686 B2 | 5/2011 | Friedlander et al. | |
| 7,970,759 B2 | 6/2011 | Friedlander et al. | |
| 8,046,358 B2 | 10/2011 | Thattil | |
| 8,055,603 B2 | 11/2011 | Angell et al. | |
| 8,145,582 B2 | 3/2012 | Angell et al. | |
| 8,199,982 B2 | 6/2012 | Fueyo et al. | |
| 8,291,064 B2 | 10/2012 | Lake | |
| 8,713,190 B1 * | 4/2014 | Goodall et al. | 709/231 |
| 2002/0082886 A1 * | 6/2002 | Manganaris et al. | 705/7 |
| 2002/0178077 A1 * | 11/2002 | Katz et al. | 705/26 |
| 2004/0162838 A1 | 8/2004 | Murayama et al. | |
| 2005/0038794 A1 * | 2/2005 | Piersol | 707/100 |
| 2006/0190195 A1 | 8/2006 | Watanabe et al. | |
| 2007/0185850 A1 | 8/2007 | Walters et al. | |
| 2007/0208497 A1 | 9/2007 | Downs et al. | |
| 2008/0005067 A1 | 1/2008 | Dumais et al. | |
| 2008/0086442 A1 | 4/2008 | Dasdan et al. | |
| 2008/0104688 A1 | 5/2008 | Paskett et al. | |
| 2008/0201278 A1 * | 8/2008 | Muller et al. | 706/12 |
| 2008/0275891 A1 * | 11/2008 | Park et al. | 707/100 |
| 2009/0299988 A1 | 12/2009 | Hamilton, II et al. | |
| 2010/0174753 A1 * | 7/2010 | Goranson | 707/791 |
| 2011/0040724 A1 | 2/2011 | Dircz | |
| 2011/0066649 A1 | 3/2011 | Berlyant et al. | |
| 2011/0137882 A1 | 6/2011 | Weerasinghe | |
| 2012/0296910 A1 | 11/2012 | Skubacz et al. | |
| 2013/0018885 A1 * | 1/2013 | Guenkova-Luy | 707/737 |
| 2013/0290110 A1 * | 10/2013 | LuVogt et al. | 705/14.66 |
| 2014/0046954 A1 * | 2/2014 | MacLean et al. | 707/748 |
| 2014/0095425 A1 * | 4/2014 | Sipple | 706/52 |

OTHER PUBLICATIONS

Muthukrishnan, S. "Data Streams: Algorithms and Applications." pp. 1-39; 2005.

Faulkner, P., "Common Patterns for Synthetic Events in Websphere Business Events" Jan. 15, 2011, http://www.ibm.com/developerworks/websphere/bpmjournal/1101_faulkner2/1101_faulker2.html, pp. 1-6.

Evaggelio Pitoura et al., "Context in Databases"; University if Ioannina, Greece; 2004; pp. 1-19.

U.S. Appl. No. 13/903,488; Non-Final Rejection dated Jun. 19, 2015.

* cited by examiner

MINIMIZATION OF SURPRISAL CONTEXT DATA THROUGH APPLICATION OF A HIERARCHY OF REFERENCE ARTIFACTS

REFERENCE TO RELATED APPLICATIONS

This application is a continuation-in-part of pending parent application Ser. No. 13/903,488, filed May 28, 2013, entitled "DISCOVERY OF UNUSUAL, UNEXPECTED, OR ANOMALOUS INFORMATION AND TRENDS IN HIGH THROUGHPUT DATA STREAMS AND DATABASES USING PROBABILITSTIC SURPRISAL CONTEXT FILTERS". The aforementioned application is hereby incorporated herein by reference.

BACKGROUND

The present invention relates to discovering unusual, unexpected or anomalous information and trends in high throughput data streams and databases, and more specifically to using probabilistic surprisal context filters to discover unusual, unexpected or anomalous information and trends in high throughput data streams and databases.

Discovering unexpected information and trends in high throughput data streams and ultra large data structures is very difficult. It is especially problematic to do so in a manner that approximates real time. The unexpected information and trends are especially useful to decision makers. The unexpected information and trends cannot be found through data mining, classic queries or big data stream processing. Big data being defined as data that exceeds the processing capacity of conventional database systems, where the data is too big, moves too fast, or does not fit the structures of common database architectures.

SUMMARY

According to one embodiment of the present invention, a method for minimizing surprisal context data. The method comprises the steps of: a computer identifying characteristics of at least one data event; the computer receiving an input of rank of at least two identified characteristics of the at least one data event; the computer generating a hierarchy of ranked, identified characteristics based on the rank of the at least two identified characteristics of the at least one data event; the computer comparing the hierarchy of ranked, identified characteristics to a repository of reference artifacts arranged in characteristic context patterns. If at least one reference artifact arranged in characteristic context patterns from the repository matches the hierarchy of ranked, identified characteristics, then the computer storing the characteristic context pattern with the least one matched reference artifact in a repository as a surprisal context filter with context determined to be probabilistically present within a specified degree of certainty in a data input; the computer comparing the data input to the selected at least one surprisal context filter; the computer discarding the events from the data input that are the same as the context data for which the at least one surprisal context filter selects; and the computer storing in a repository the events remaining in the data input as anomalous events.

According to another embodiment of the present invention, a computer program product for minimizing surprisal context data. The computer program product comprises: one or more computer-readable, tangible storage devices; program instructions, stored on at least one of the one or more storage devices, to identify characteristics of at least one data event; program instructions, stored on at least one of the one or more storage devices, to receive an input of rank of at least two identified characteristics of the at least one data event; program instructions, stored on at least one of the one or more storage devices, to generate a hierarchy of ranked, identified characteristics based on the rank of the at least two identified characteristics of the at least one data event; program instructions, stored on at least one of the one or more storage devices, to compare the hierarchy of ranked, identified characteristics to a repository of reference artifacts arranged in characteristic context patterns. If at least one reference artifact arranged in characteristic context patterns from the repository matches the hierarchy of ranked, identified characteristics, program instructions, stored on at least one of the one or more storage devices, to then store the characteristic context pattern with the least one matched reference artifact in a repository as a surprisal context filter with context determined to be probabilistically present within a specified degree of certainty in a data input; compare the data input to the selected at least one surprisal context filter; discard the events from the data input that are the same as the context data for which the at least one surprisal context filter selects; and store in a repository the events remaining in the data input as anomalous events.

According to another embodiment of the present invention, a system for minimizing surprisal context data, the system comprises: one or more processors, one or more computer-readable memories and one or more computer-readable, tangible storage devices; program instructions, stored on at least one of the one or more storage devices for execution by at least one of the one or more processors via at least one of the one or more memories, to identify characteristics of at least one data event; program instructions, stored on at least one of the one or more storage devices for execution by at least one of the one or more processors via at least one of the one or more memories, to receive an input of rank of at least two identified characteristics of the at least one data event; program instructions, stored on at least one of the one or more storage devices for execution by at least one of the one or more processors via at least one of the one or more memories, to generate a hierarchy of ranked, identified characteristics based on the rank of the at least two identified characteristics of the at least one data event; program instructions, stored on at least one of the one or more storage devices for execution by at least one of the one or more processors via at least one of the one or more memories, to compare the hierarchy of ranked, identified characteristics to a repository of reference artifacts arranged in characteristic context patterns. If at least one reference artifact arranged in characteristic context patterns from the repository matches the hierarchy of ranked, identified characteristics, program instructions, stored on at least one of the one or more storage devices for execution by at least one of the one or more processors via at least one of the one or more memories, to then store the characteristic context pattern with the least one matched reference artifact in a repository as a surprisal context filter with context determined to be probabilistically present within a specified degree of certainty in a data input; compare the data input to the selected at least one surprisal context filter; discard the events from the data input that are the same as the context data for which the at least one surprisal context filter selects; and store in a repository the events remaining in the data input as anomalous events.

DETAILED DESCRIPTION

Figure 1:
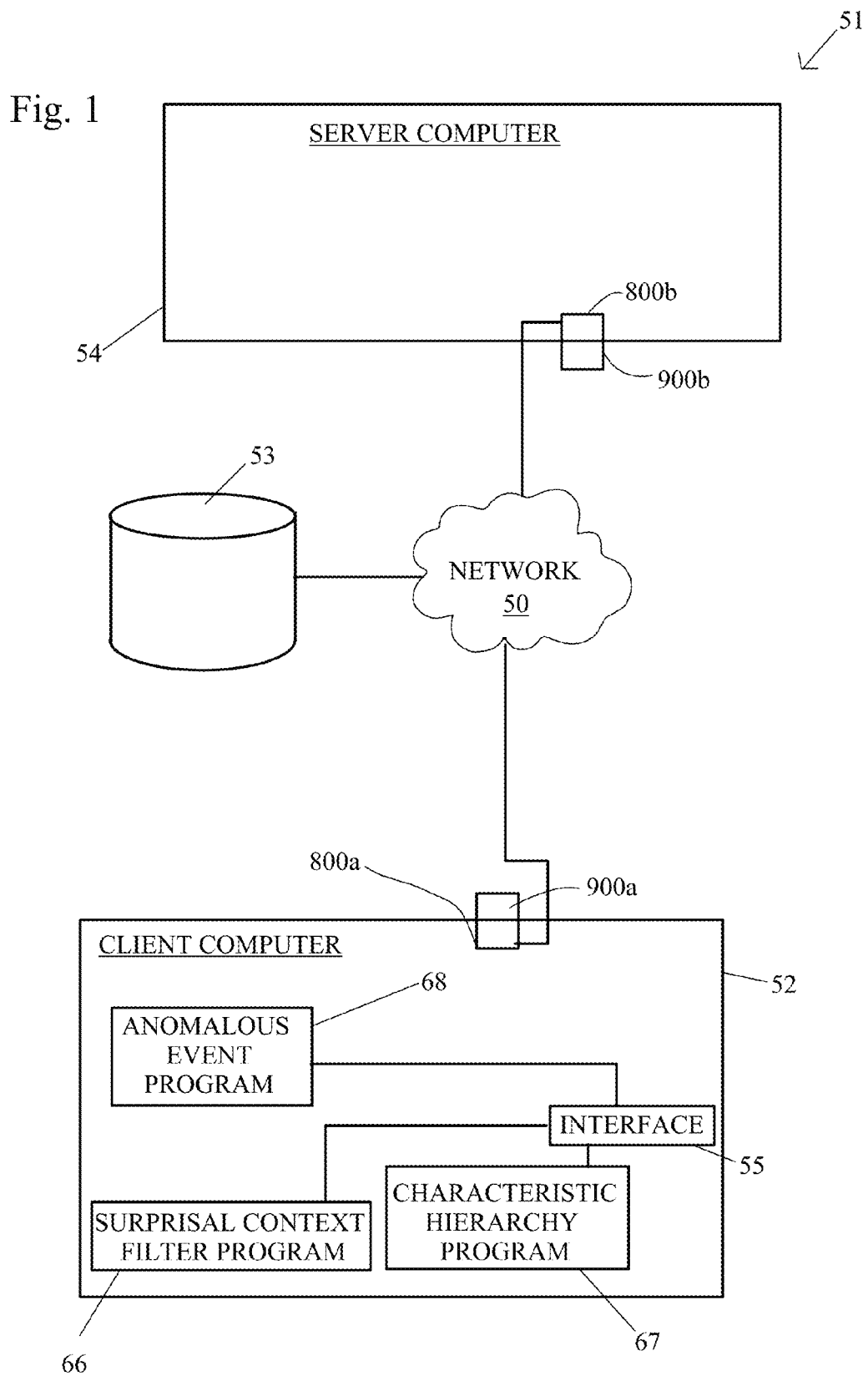
FIG. 1 depicts an exemplary diagram of a possible data processing environment in which illustrative embodiments may be implemented.

The illustrative embodiments recognize that "events" are occurrences of information, trends within data. The events may be unusual, unexpected, or anomalous information and trends or usual and expected.

The illustrative embodiments recognize that "context data" is data that provides a context that identifies a specific subject matter from multiple subject matters.

The illustrative embodiments recognize that the dimensionality of the data reduction that occurs by removing the "common" or expected information from a data stream or database of events is significant and greatly reduces the data that may need to be reviewed by decision makers.

The illustrative embodiments recognize that by identifying what data is "common" or provides a "normally expected" value, for example in a filter with probabilistic certainty, the surprisal context filters can filter or select the incoming data and allow the "normally expected" data to be rationally removed and leave only what data is "surprising" or provides an "unexpected value" relative to the normally expected value. The data that is "surprising" can provide context data for an unusual, unexpected, or anomalous events and associated information and trends within data.

In the illustrated embodiments of the present invention, the "reference artifacts" may be present within characteristic context patterns defined by the type or class of data being inputted. The reference artifacts or characteristic context patterns provide the context data of the surprisal context filter that is "common" or provides a "normally expected" context of an event within the data.

In the illustrative embodiments, "surprisal context data" is defined as at least one contextual difference or event within the database or input data stream that provides an unexpected value relative to the normally expected value of the events of the data input. In other words, the surprisal context data contains at least one instance of at least one data context item difference present after the surprisal context filter selects for or filters the incoming data stream or the events in the database. The surprisal context data that is actually stored in the repository preferably includes the events and associated context data that were not discarded or filtered out after being compared to or filtered through the surprisal context filter.

In the illustrative embodiments of the present invention, the term "surprisal context filters" or "filter" is defined as context data/reference artifact or characteristic context pattern that has been recognized or identified as "common" or provide a "normally expected" event within a specific probabilistic certainty from the data. For example a filter with a probability of 0.9, is a filter in which 90% of the context data in the filter is with certainty known to be common to the events or incoming data being monitored. The data may be filtered through more than one filter. If more than one filter is present, the probabilistic certainty is preferably different for each of the filters. For example a first surprisal context filter may have a probability of 0.7 and a second surprisal context filter may have a probability of 0.9.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, client computer 52, repository 53, and server computer 54 connect to network 50. In other exemplary embodiments, network data processing system 51 may include additional client computers, storage devices, server computers, and other devices not shown. Client computer 52 includes a set of internal components 800a and a set of external components 900a, further illustrated in FIG. 4. Client computer 52 may be, for example, a mobile device, a cell phone, a personal digital assistant, a netbook, a laptop computer, a tablet computer, a desktop computer, or any other type of computing device.

Client computer 52 may contain an interface 55. Through the interface 55, anomalous trends, events or information may be viewed by a user or a decision maker, for example through the anomalous event program 68. The interface 55 may accept commands and data entry from a user. The interface 55 can be, for example, a command line interface, a graphical user interface (GUI), or a web user interface (WUI) through which a user can access a surprisal context filter compare program 66, anomalous event program 68, or the characteristic hierarchy program 67. While both the surprisal context filter compare program 66, anomalous event program 68, and the characteristic hierarchy program 67 are shown on the client computer 52 they may alternatively be on the server computer 54 and accessed through an interface on the client computer 52. The interface 55 may also accept an input regarding a rank of at least two identified characteristics, to display a hierarchy of the inputted identified characteristics that is created, and/or to display reference artifacts or characteristic context patterns of the reference artifacts.

In the depicted example, server computer 54 provides information, such as boot files, operating system images, and applications to client computer 52. Server computer 54 includes a set of internal components 800b and a set of external components 900b illustrated in FIG. 4 and may also include the components shown in FIG. 4.

Figure 4:
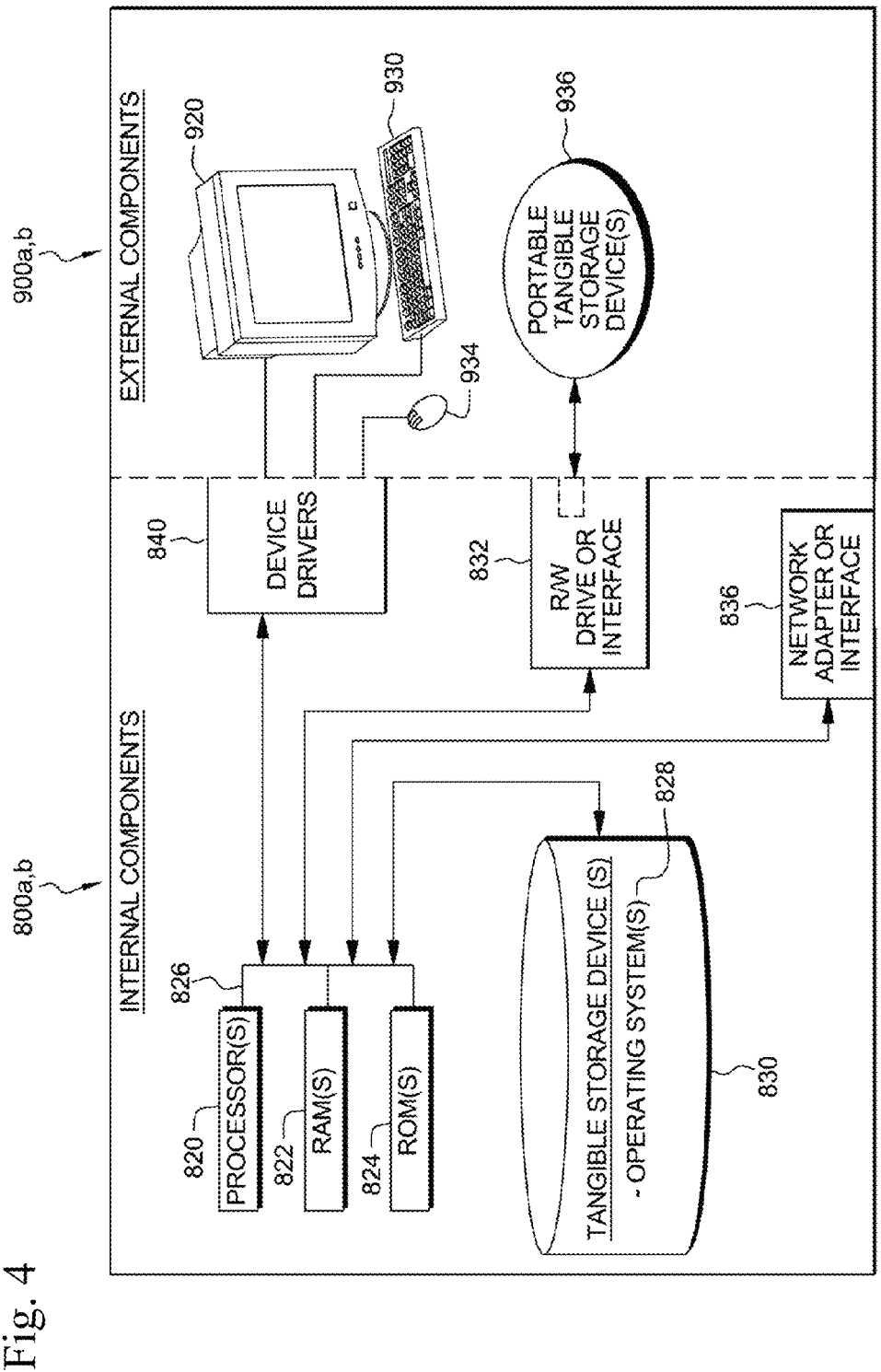
FIG. 4 illustrates internal and external components of a client computer and a server computer in which illustrative embodiments may be implemented.

Program code, surprisal context filters, reference artifacts, surprisal context data and programs such as a surprisal context filter program 66, anomalous event program 68, and a characteristic hierarchy program 67 may be stored on at least one of one or more computer-readable tangible storage devices 830 shown in FIG. 4, on at least one of one or more portable computer-readable tangible storage devices 936 as shown in FIG. 4, on repository 53 connected to network 50, or downloaded to a data processing system or other device for use.

For example, program code, surprisal context filters, reference artifacts, surprisal context data and programs such as a surprisal context filter program 66, anomalous event program 68, and a characteristic hierarchy program 67 may be stored on at least one of one or more tangible storage devices 830 on server computer 54 and downloaded to client computer 52 over network 50 for use on client computer 52. Alternatively, server computer 54 can be a web server, and the surprisal context filters, surprisal context data, reference artifacts, and programs such as a surprisal context filter program 66, anomalous event program 68, and a characteristic hierarchy program 67 may be stored on at least one of the one or more tangible storage devices 830 on server computer 54 and accessed on client computer 52. In other exemplary embodiments, the program code, surprisal context filters, reference artifacts, surprisal context data and programs such as a surprisal context filter program 66, anomalous event program 68, and a characteristic hierarchy program 67 may be stored on at least one of one or more computer-readable tangible storage devices 830 on client computer 52 or distributed between two or more servers.

Figure 2:
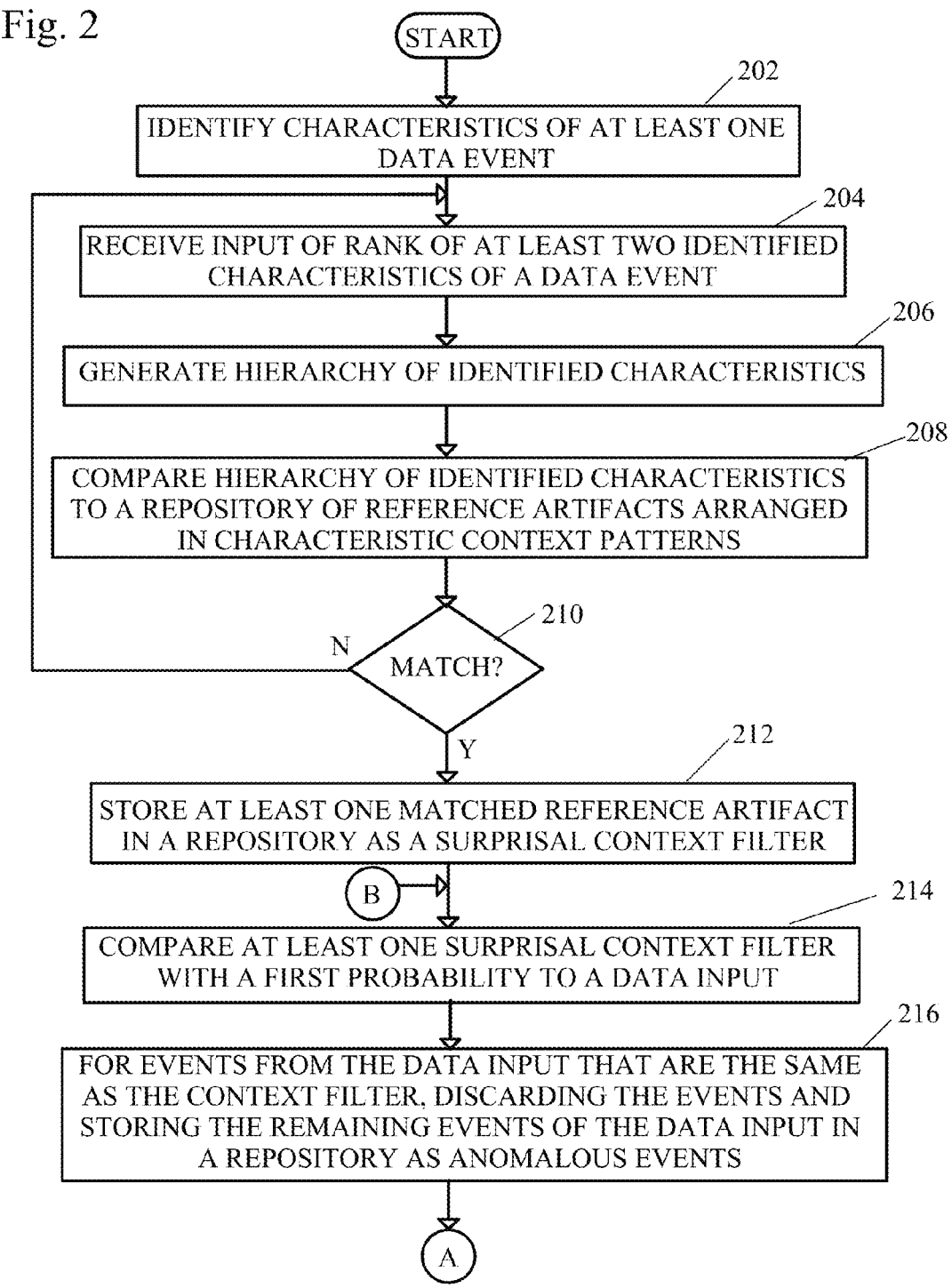
FIGS. 2-3 shows a flowchart of a method of minimizing surprisal context data by comparing a data event to a hierarchy of reference artifacts based on identified characteristics of an event.
Figure 3:
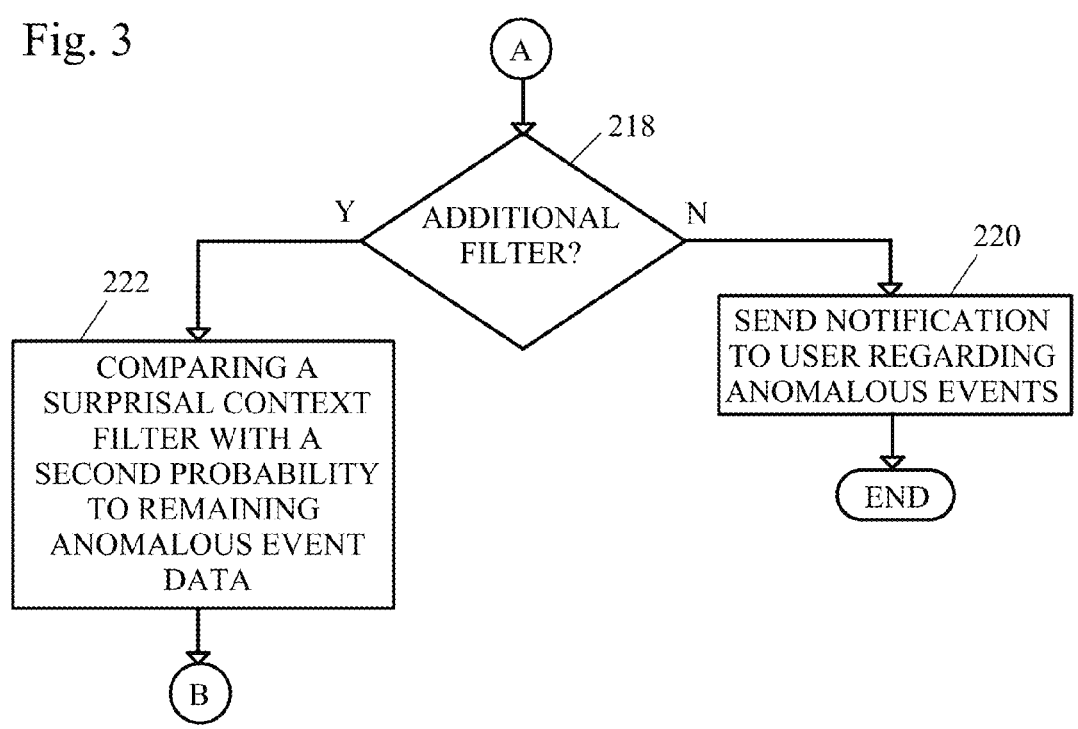

FIGS. 2-3 shows a flowchart of a method of minimizing surprisal context data by comparing a data event to a hierarchy of reference artifacts based on identified characteristics of an event according to an illustrative embodiment.

In a first step, characteristics of at least one data event are identified from a repository (step 202), for example in repository 53 by the characteristic hierarchy program 67 as shown in FIG. 1. The characteristics may be, but are not limited to, facts regarding an event, history of the event, and other such characteristics or identifying indicators.

An input of rank of at least two identified characteristics of an event is received from a user (step 204), for example through interface 55. The rank provides the relative value, weight or importance of identified specific characteristics. This rank may be equivalent to the probability of the surprisal context filter. From the inputted rank of at least two identified characteristics, a hierarchy of identified characteristics is generated (step 206), for example by the characteristic hierarchy program 67.

The hierarchy of identified characteristics generated may be defined as a matter of order or pattern, with the order being between the identified characteristics, which are classified in different nested categories, or an ordered series of identified characteristics in which each term is superior relative to a specific set of identified characteristics. The hierarchy may also be based on the relative probability of it occurring within the event itself. The hierarchy can be: a simple linear hierarchy, a branching network of subcategories, and/or a nested hierarchy of categories.

For example, a hierarchy with a branching network of subcategories may have a primary category of disaster events and secondary categories of man-made disaster events and weather-related disaster events.

An example of a nested hierarchy of categories may have weather-related disaster events as a primary category and secondary categories of: high winds, water levels of bodies of water, amount of precipitation, magnitude and intensity, volcanic activity, and tidal forces. Note that a disaster could have from zero to all of the secondary categories. The secondary categories could have additional inclusive or mutually exclusive categories.

The hierarchy of identified characteristics is then compared to a repository of reference artifacts (step 208). The reference artifacts may be arranged in characteristic context patterns defined by the type or class of data being inputted. The characteristic context patterns preferably have an associated probability. For example, the characteristic context pattern occurs 85% of the time relative to the event being compared to. The reference artifacts provide the context data in the surprisal context filter that is "common" or provides a "normally expected" event within the data. For example, continuing with the example from above, a characteristic context pattern may include a pattern for a tropical cyclone that has a water temperature of at least 26.5° C. to a depth of at least 50 m, high humidity level, low amounts of wind shear, and within five degrees of latitude away from the equator. In other words, the reference artifacts are a representative example of "common" or "expected" context data that occurs within an event.

If a match (step 210) is not present between at least one reference artifact or characteristic context pattern used to form a surprisal context filter in the repository and the hierarchy generated of the identified characteristics, then, the method returns to step 204 of receiving an input of the rank of at least two identified characteristics of at least one data event.

The user may set what is considered a match to the hierarchy through the interface, for example interface 55. For example, the user may set that a match between a reference artifact and the hierarchy is only present if a match is found with the hierarchy or the hierarchy and a neighbor, and so on. Alternatively, a match may be based on a probability threshold.

If a match (step 210) is present between at least one reference artifact in the repository and the hierarchy generated of the identified characteristics, the at least one matched reference artifact is stored in a repository as a surprisal context filter (step 212). The repository may be repository 53 or a separate repository.

A surprisal context filter with the at least one matched reference artifact is then compared to the data input (step 214), for example by the surprisal context filter program 66. The data input for the data or events that is the same as the context data from the reference artifacts in which the surprisal context filter selects for or filters is discarded and the remaining data input or events of the data input are stored in a database or repository as anomalous events (step 216).

The data input that is the same as the context data in which the surprisal context filter selects for can be discarded since it is determined to be "common" or "expected" within the certainty expressed by the probability of the filter. So, if the surprisal context filter had a probability of 0.9, the anomalous data or event of context data that was not selected for has a 0.1 chance of being common and not surprising. With the probability of this being low, there is a greater chance that the data or event is providing actual context data for an anomalous event and the context data should be flagged for a user or decision maker to view.

The data input that is the same as the context data in which the surprisal context filter selects for can be discarded since it is determined to be "common" or "expected" within the certainty expressed by the probability of the filter.

If there are no additional filters (step 218), a notification of anomalous events is sent to a user or decision maker (step 220) and the method ends. The notification may be automatically generated, for example by the anomalous event program 68. The notification may be an e-mail, text based message, or any type of notification to alert the user.

If there is an additional filter selected (step 218), the additional filter preferably has a second probability, different than the first probability, and the surprisal context filter with a second probability is compared to the anomalous event data (step 222), which now acts as the data input. The method continues with step 216 of discarding the data or events from the data input (anomalous event data of step 222) that is the same as the context data in which the surprisal context filter selects for or filters and storing the remaining data as anomalous events (step 216) and the method continues through steps 220 or 222.

The data input may be real time transactions from a data stream or alternatively the data input can be from a database.

The data input that is the same as the context data in which the surprisal context filter selects for can be discarded since it is determined to be "common" or "expected" within the certainty expressed by the probability of the filter. So, if the surprisal context filter had a probability of 0.9, the anomalous data or event of context data that was not selected for has a 0.1 chance of being common and not surprising. With the probability of this being low, there is a greater chance that the data or event is providing actual context data for an anomalous event and the context data should be flagged for a user or decision maker to view.

For example, if the data input were to be real time transactions from all of the cash registers of a store nationwide, the surprisal context filter may be chosen to have a 0.9 probability, meaning that there is a 90% certainty that the transactions or events, as determined by a characteristic context pattern of reference artifacts, the contents within those transactions, the prices paid are common or expected. The data input of the transactions, including the contents is filtered by the context data of the surprisal context filter. Transactions that have the context data present in or being selected for by the surprisal context filter that are common are discarded. The transactions that are not common or include a combination of items that is not shown as expected from the store are stored in a repository as anomalous events. These combinations of products may cause harm when purchased together or may be used to generate harmful substances. These transactions may be viewed by the company to determine if there is an anomalous event, for example an employee severely discounting certain items or a combination of items. Prior to the transactions being viewed by the company, the anomalous events may be filtered through another surprisal context filter, filtering for other context data that may apply in a small number of situations, thus reducing the anomalous events to be viewed by the store.

Another example of recognizing an opportunity while not being able to pinpoint the cause would be a sudden jump in grocery carts which contain red wine, muscles, feta cheese, and extra virgin olive oil. Possible triggers for this run on a specific set of grocery items may have been a television cooking show, article in a cooking magazine, or a project at a local cooking club. The specific underlying cause does not have to be detected by the system, just the effect. In the future when the system detects the start of this particular systematic pattern it will respond by accelerating the stocking of the items in this particular purchase set.

Alternatively, the data input may be already present in a database for viewing. The data may be gathered from the store for the entire day and then all of the transactions are filtered through the surprisal context filters for anomalous events.

FIG. 4 illustrates internal and external components of client computer 52 and server computer 54 in which illustrative embodiments may be implemented. In FIG. 4, client computer 52 and server computer 54 include respective sets of internal components 800a, 800b, and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, a surprisal context filter program 66 are stored on one or more of the computer-readable tangible storage devices 830 for execution by one or more of the processors 820 via one or more of the RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A surprisal context filter program 66 and an anomalous event program 67 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. A surprisal context filter program 66, characteristic hierarchy program 67, and/or an anomalous event program 68 can be downloaded to client computer 52 and server computer 54 from an external computer via a network (for example, the Internet, a local area network or other, wide area network) and network adapter or interface 836. From the network adapter or interface 836, a surprisal context filter program 66, characteristic hierarchy program 67 and an anomalous event program 68 is loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

A surprisal context filter program 66, characteristic hierarchy program 67 and an anomalous event program 68 can be written in various programming languages including low-level, high-level, object-oriented or non object-oriented languages. Alternatively, the functions of a surprisal context filter program 66, characteristic hierarchy program 67 and an anomalous event program 68 can be implemented in whole or in part by computer circuits and other hardware (not shown).

Based on the foregoing, a computer system, method, and program product have been disclosed for minimizing surprisal context data. However, numerous modifications and substitutions can be made without deviating from the scope of the present invention. Therefore, the present invention has been disclosed by way of example and not limitation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of minimizing surprisal context data, the method comprising the steps of:
    a computer identifying characteristics of at least one data event; the computer receiving an input of rank of at least two identified characteristics of the at least one data event;
    the computer generating a hierarchy of ranked, identified characteristics based on the rank of the at least two identified characteristics of the at least one data event;
    the computer comparing the hierarchy of ranked, identified characteristics to a repository of reference artifacts arranged in characteristic context patterns;
    when at least one reference artifact arranged in characteristic context patterns from the repository matches the hierarchy of ranked, identified characteristics,
    the computer storing the characteristic context pattern with the least one matched reference artifact in a repository as a surprisal context filter with context determined to be probabilistically present within a specified degree of certainty in a data input;
    the computer comparing the data input to the selected at least one surprisal context filter;
    the computer discarding the events from the data input that are the same as the context data for which the at least one surprisal context filter selects; and
    the computer storing in a repository the events remaining in the data input as anomalous events.

2. The method of claim 1, wherein if more than one surprisal context filter is present, each of the surprisal context filters have context data determined to be probabilistically present at different specified degrees of certainty in the data input.

3. The method of claim 1, wherein the data input is a data stream.

4. The method of claim 1, wherein the data input is data stored in a database.

5. The method of claim 1, further comprising the step of the computer sending a notification to a user regarding the anomalous events.

6. The computer program product of claim 1, wherein the data input is a data stream.

7. The computer program product of claim 1, wherein the data input is data stored in a database.

8. The computer program product of claim 1, further comprising the step of the computer sending a notification to a user regarding the anomalous events.

9. A computer program product for minimizing surprisal context data, the computer program product comprising:
- one or more computer-readable, tangible storage devices;
- program instructions, stored on at least one of the one or more storage devices, to identify characteristics of at least one data event;
- program instructions, stored on at least one of the one or more storage devices, to receive an input of rank of at least two identified characteristics of the at least one data event;
- program instructions, stored on at least one of the one or more storage devices, to generate a hierarchy of ranked, identified characteristics based on the rank of the at least two identified characteristics of the at least one data event;
- program instructions, stored on at least one of the one or more storage devices, to compare the hierarchy of ranked, identified characteristics to a repository of reference artifacts arranged in characteristic context patterns;
- when at least one reference artifact arranged in characteristic context patterns from the repository matches the hierarchy of ranked, identified characteristics,
- program instructions, stored on at least one of the one or more storage devices, to store the characteristic context pattern with the least one matched reference artifact in a repository as a surprisal context filter with context determined to be probabilistically present within a specified degree of certainty in a data input;
- compare the data input to the selected at least one surprisal context filter;
- discard the events from the data input that are the same as the context data for which the at least one surprisal context filter selects; and
- store in a repository the events remaining in the data input as anomalous events.

10. The computer program product of claim 9, wherein when more than one surprisal context filter is present, each of the surprisal context filters have context data determined to be probabilistically present at different specified degrees of certainty in the data input.

11. A system for minimizing surprisal context data, the system comprising:
- one or more processors, one or more computer-readable memories and one or more computer-readable, tangible storage devices;
- program instructions, stored on at least one of the one or more storage devices for execution by at least one of the one or more processors via at least one of the one or more memories, to identify characteristics of at least one data event;
- program instructions, stored on at least one of the one or more storage devices for execution by at least one of the one or more processors via at least one of the one or more memories, to receive an input of rank of at least two identified characteristics of the at least one data event;
- program instructions, stored on at least one of the one or more storage devices for execution by at least one of the one or more processors via at least one of the one or more memories, to generate a hierarchy of ranked, identified characteristics based on the rank of the at least two identified characteristics of the at least one data event;
- program instructions, stored on at least one of the one or more storage devices for execution by at least one of the one or more processors via at least one of the one or more memories, to compare the hierarchy of ranked, identified characteristics to a repository of reference artifacts arranged in characteristic context patterns;
- when at least one reference artifact arranged in characteristic context patterns from the repository matches the hierarchy of ranked, identified characteristics,
- program instructions, stored on at least one of the one or more storage devices for execution by at least one of the one or more processors via at least one of the one or more memories, to store the characteristic context pattern with the least one matched reference artifact in a repository as a surprisal context filter with context determined to be probabilistically present within a specified degree of certainty in a data input;
- compare the data input to the selected at least one surprisal context filter;
- discard the events from the data input that are the same as the context data for which the at least one surprisal context filter selects; and
- store in a repository the events remaining in the data input as anomalous events.

12. The system of claim 11, wherein when more than one surprisal context filter is present, each of the surprisal context filters have context data determined to be probabilistically present at different specified degrees of certainty in the data input.

13. The system of claim 11, wherein the data input is a data stream.

14. The system of claim 11, wherein the data input is data stored in a database.

15. The system of claim 11, further comprising the step of the computer sending a notification to a user regarding the anomalous events.

* * * * *